United States Patent [19]

Gavagan et al.

[11] Patent Number: 4,721,310
[45] Date of Patent: Jan. 26, 1988

[54] VEHICLE ACCESSORY ASSEMBLY FOR MOUNTING ON A VISOR OR OTHER INTERIOR PANEL

[75] Inventors: James A. Gavagan, Center Line; Leslie R. Hinds; Mark Lobanoff, both of Troy, all of Mich.

[73] Assignee: Irvin Industries, Inc., Rochester Hills, Mich.

[21] Appl. No.: 13,656

[22] Filed: Feb. 12, 1987

Related U.S. Application Data

[63] Continuation-in-part of Ser. No. 007,120, Jan. 27, 1987, which is a continuation-in-part of Ser. No. 795,520, Nov. 6, 1985, which is a continuation-in-part of Ser. No. 746,676, Jun. 20, 1985, abandoned, which is a continuation-in-part of Ser. No. 627,280, Jul. 2, 1984, abandoned.

[51] Int. Cl.⁴ ................................. B60J 3/02
[52] U.S. Cl. .................... 296/97 H; 49/379; 49/394; 292/78
[58] Field of Search .............. 296/97 H, 97 R; 49/379 X, 394 X; 16/277; 292/122, 128, 78 X, DIG. 63, DIG. 38; 220/324, 326, 335; 362/135, 137

[56] References Cited

U.S. PATENT DOCUMENTS

| | | | |
|---|---|---|---|
| 1,530,162 | 3/1925 | Foreman | 224/276 |
| 2,148,557 | 2/1939 | Hook | 296/97 C |
| 2,268,189 | 12/1941 | Colbert | 362/140 |
| 3,166,080 | 1/1965 | Neal | 220/335 |
| 3,305,679 | 2/1967 | Barcita-Peruchena | 362/136 |
| 3,641,334 | 2/1972 | Kipping | 244/414 |
| 3,794,828 | 2/1974 | Arpino | 362/141 |
| 3,926,470 | 12/1975 | Marcus | 296/97 B |
| 4,000,404 | 12/1976 | Marcus | 296/97 H |
| 4,075,468 | 2/1978 | Marcus | 297/97 H |
| 4,227,241 | 10/1980 | Marcus | 296/97 H |
| 4,491,899 | 1/1985 | Fleming | 296/97 H |
| 4,585,139 | 4/1986 | Bonsen et al. | 220/335 |

FOREIGN PATENT DOCUMENTS

2027386 12/1971 Fed. Rep. of Germany .

Primary Examiner—Robert R. Song
Attorney, Agent, or Firm—Harness, Dickey & Pierce

[57] ABSTRACT

A vehicle accessory assembly is disclosed for mounting on an interior panel, such as on a visor, for example, and includes an accessory device, such as a vanity mirror assembly, interconnected with the visor or other vehicle panel at a generally fixed location thereon. A preferred top-hinged accessory door is pivotally interconnected with the visor or other interior panel for selective pivotal movement about a pivot axis between a closed position wherein the accessory device is substantially covered and an open position wherein the accessory device is substantially exposed. A resilient biasing device is provided for resiliently biasing the accessory door toward the open position, and an overrideable latch apparatus is adapted for retaining the accessory door in the closed position. The latch apparatus is selectively actuable to release the accessory door, whereupon the resilient biasing device urges the accessory door into the open position, and a damper apparatus is preferably included for dampening the pivotal movement of the accessory door.

44 Claims, 17 Drawing Figures

VEHICLE ACCESSORY ASSEMBLY FOR MOUNTING ON A VISOR OR OTHER INTERIOR PANEL

CROSS-REFERENCE TO RELATED APPLICATIONS

This is a continuation-in-part of a copending application for U.S. Letters Patent, Ser. No. 007120, filed Jan. 27, 1987, entitled VEHICLE ACCESSORY ASSEMBLY, which is a continuation-in-part of a copending application for U.S. Letters Patent, Ser. No. 795,520, filed Nov. 6, 1985, which is a continuation-in-part of an application for U.S. Letters Patent, Ser. No. 746,676, filed June 20, 1985 (now abandoned), which was in turn a continuation-in-part of an application for U.S. Letters Patent, Ser. No. 627,280, filed July 2, 1984 (now abandoned), and all of said applications are expressly incorporated herein by reference.

BACKGROUND AND SUMMARY OF THE INVENTION

The present invention relates generally to various vehicle accessory assemblies, including vanity mirror assemblies, mirror and light assemblies, and the like, and more particularly to such accessory assemblies adapted for mounting on a vehicle visor, or on other vehicle interior panels.

Automotive vehicle visors having lighted vanity mirrors are well-known in the art. Such vanity mirrors are normally located on the side of the visor facing the passenger when the visor is in a lowered position and may be adjusted to the desired reflecting angle through adjustment of the visor, or by adjustment of the angle of the mirror relative to the visor. These vanity mirror assemblies, as well as various lights and/or other vehicle accessories, are frequently provided for the comfort and convenience of forward seat passengers.

Although many of the previous vehicle accessory assemblies mentioned above have performed well and have added to the convenience, comfort, and attractiveness of vehicle interiors in which they have been employed, it is an object of the present invention to improve even further on the utility and attractiveness of such vehicle accessory assemblies by providing a neat, attractive, up-scaled accessory assembly, which can incorporate a vanity mirror, a vanity mirror and light, or other vehicle accessory arrangements.

Another object of the present invention is to provide such a vehicle accessory assembly that is relatively simple and inexpensive to manufacture and install, either as standard or optional equipment on a vehicle, and that provides a substantial improvement in consumer-perceived quality.

According to the present invention, a vehicle accessory assembly adapted for mounting on an interior panel, such as on a visor, for example, includes an accessory device, such as a vanity mirror assembly, interconnected with the visor or other vehicle panel at a generally fixed location thereon. A preferred top-hinged accessory door is pivotally interconnected with the visor or other interior panel for selective pivotal movement about a pivot axis between a closed position wherein the accessory device is substantially covered and an open position wherein the accessory device is substantially exposed. A resilient biasing device is provided for resiliently biasing the accessory door toward the open position, and a latch apparatus is adapted for retaining the accessory door in the closed position. The latch apparatus is selectively actuable to release the accessory door, whereupon the resilient biasing device urges the accessory door into the open position, and a damper apparatus is preferably included for dampening the pivotal movement of the accessory door.

In at least some of the preferred embodiments, a latch override arrangement is provided for releasing the accessory door without actuation of the latch apparatus in response to opening forces exerted upon the accessory door in excess of a predetermined threshold opening force in order to override the latch apparatus and substantially prevent damage to the vehicle accessory assembly. Furthermore, an obstruction arrangement is preferably provided in association with the latch apparatus for substantially obstructing access to the latch apparatus from predetermined positions generally adjacent to the latch apparatus in order to substantially prevent unintended actuation of the latch apparatus from such predetermined position. This feature is especially useful in visor-mounted applications, wherein the insertion of maps, sunglasses, or other such articles for storage behind the visor can result in inadvertent engagement with, and actuation of, the latch apparatus.

Additional objects, advantages and features of the present invention will become apparent from the following description and appended claim, taken in conjunction with the accompanying drawings.

DETAILED DESCRIPTION OF THE PREFERRED EMBODIMENTS

FIGS. 1 through 17 illustrate various exemplary embodiments of vanity mirror assemblies, mirror and light assemblies, or other vehicle accessory assemblies, mounted generally on a vehicle visor or other vehicle interior panels in accordance with the present invention. From the following discussion, taken in conjunction with the drawings and the appended claims, one skilled in the art will readily recognize that the principles of the present invention can be applied to the mounting of vehicle accessory assemblies other than those shown for purposes of illustration in the drawings, as well as to the mounting of such vehicle accessory assemblies in locations other than on vehicle visors, such as in headliners, interior door panels, or other desired loctions in the vehicle interior.

In FIGS. 1 through 10, one of the preferred embodiments of the present invention is illustrated, wherein a vanity mirror assembly 10 is mounted on one side of a vehicle visor 12 of a vehicle interior 14. The visor 12, which can be any of a number of well-known types of vehicle visors, typically includes padding 18, which is covered by upholstery or other cloth-type fabric 20, mounted on a centerboard or other such base assembly 22, as perhaps best shown in FIG. 5.

The vanity mirror assembly 10 generally includes a top-hinged vanity door 24 pivotally interconnected with the visor 12 by way of a vanity frame assembly 26 mounted on the visor 12 and preferably recessed into the padding 18 and/or the upholstery fabric 20. The vanity door 24 is selectively pivotally movable between a closed position shown in FIG. 1, wherein the vanity mirror or other vehicle accessory device is substantially covered, and an open position shown in FIGS. 2 and 3, wherein the vanity mirror assembly or other such vehicle accessory is substantially exposed. Although other vehicle accessories can be incorporated into the present invention, as is discussed in more detail below, the vanity mirror assembly 10 shown in FIGS. 1 through 10 typically includes openings 28 and 30 in the vanity mirror assembly 26, in which a mirror 32 and/or one or more side lights 34, respectively, are disposed. In this regard, it should be noted that the mirror 32 and/or the side lights 34 can be pivotally mounted on the frame assembly 26.

As shown in FIGS. 5 through 8, the vanity door 24 preferably includes a door base 42, to which a door bezel 44, a padded portion 46 and an upholstered portion 48 are secured. The preferred vanity door is interconnected with the vanity frame assembly 26, and thus with the visor 12, by way of a hinge assembly 50 (shown in FIGS. 4 and 7), and is selectively releasable for upward, opening pivotal movement by way of actuation of a latch assembly 60 (shown in FIGS. 5, 9, and 10). A spring assembly 70 (shown in FIGS. 4 and 6) is provided for resiliently biasing the vanity door 24 toward its open position shown in FIGS. 2 and 3, and a damper assembly 80 (shown in FIGS. 4 and 8) is preferably provided for dampening the pivotal movement of the vanity door 24 from its closed position shown in FIG. 1 to its open position shown in FIGS. 2 and 3 under the upwardly-urging influence of the spring assembly 70.

The hinge assembly 50 preferably includes a pivot member 52 integrally formed on, or secured to, the vanity frame assembly 26, and a complementary socket portion 54 of the vanity door base 42, which are pivotally interconnected for pivotal motion of the vanity door 24 about a generally horizontal pivot axis 56. Although two of the hinge assemblies are shown in the drawings, one skilled in the art will readily recognize that any number of hinge assemblies can be incorporated into the vanity mirror assembly 10, depending upon the particular configuration and arrangement of a given application. In this regard, one skilled in the art will readily recognize that other known hinge assemblies can also be substituted for the exemplary hinge assembly 50 shown in the drawings.

Figure 5:
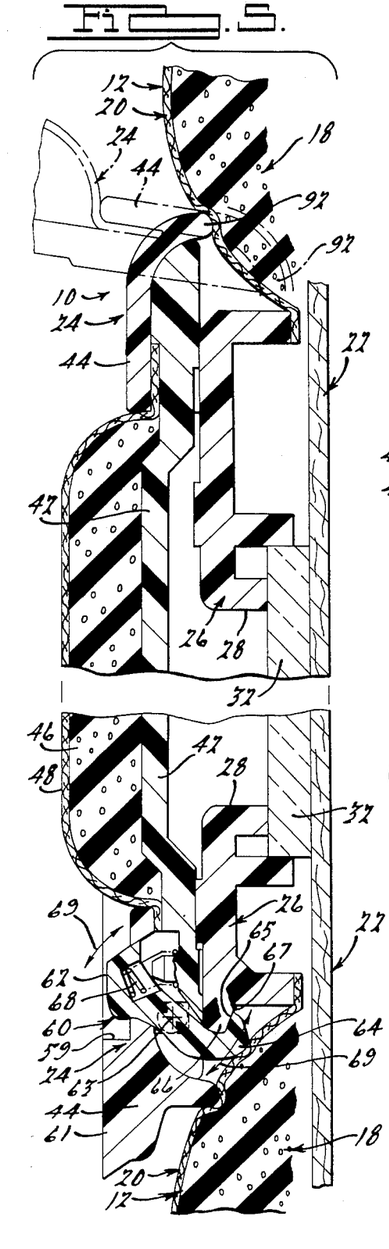
FIG. 5 is a partial cross-sectional view taken generally along line 5—5 of FIG. 1.

As shown in FIG. 5, one preferred latch assembly 60 includes a release button or actuating member 62 interconnected with the vanity door 24 for pivotal motion about a pivot axis 63 in directions indicated generally by the pivotal arcs 69. A latch member 64 is integrally formed with, or fixedly secured to, the release button 62 for pivotal motion therewith into and out of a latching engagement with a catch member 66 integrally formed with, or fixedly secured to, the vanity frame assembly 26. The latch member 64 and the catch member 66 have respective latching surfaces 65 and 67 that are mutually engageable with one another in a generally interfering relationship when the release button 62 and the latch member 64 are in their latching position shown in FIG. 5.

The latching surfaces 65 and 67 are preferably disposed at an angular relationship relative to a generally vertical plane extending through the vanity mirror assembly 10. This allows the latch member 64 and the catch member 66 to be slidably movable relative to one another out of their latching engagement shown in FIG. 5 in response to opening forces exerted upon the vanity door 24 in excess of a predetermined threshold opening force, in order to override the latching engagement of the latch member 64 and the catch member 66 and to thereby release the vanity door without actuation of the release button 62. Such an arrangement substantially prevents damage to the latch assembly 60, or other components of the vanity mirror assembly 10, in the event that the user attempts to open the vanity door 24 without first actuating the release button 62, or in the event of other such opening forces being exerted upon the vanity door 24 without actuation of the release button 62 to disengage that latch member 64 from the catch member 66. In order to return the release button 62 and the latch member 64 to their positions shown in FIG. 5 so that the vanity door 24 can be retained in its closed position, an actuating spring 68 is provided on the vanity door 24. The spring 68 resiliently biases the release button 62 outwardly, and the latch member 64 inwardly, relative to the face of the vanity door 24.

Preferably, the door bezel 44 of the vanity door 24 includes an obstruction 61, which can be in the form of an outwardly raised portion of the bezel 44, having a recessed opening 59 therein generally surrounding the release button 62. The obstruction 61 thus prevents access to the release button 62 from adjacent predetermined positions in order to substantially minimize or prevent inadvertent contact with, and actuation of, the release button 62 by the insertion of items such as maps, sunglasses, or the like for storage between the visor 12 and the vehicle interior 14. Such a feature is especially important where the vanity mirror assembly includes one or more of the side lights 34, which are typically energized upon opening of the vanity door 24.

Figure 1:
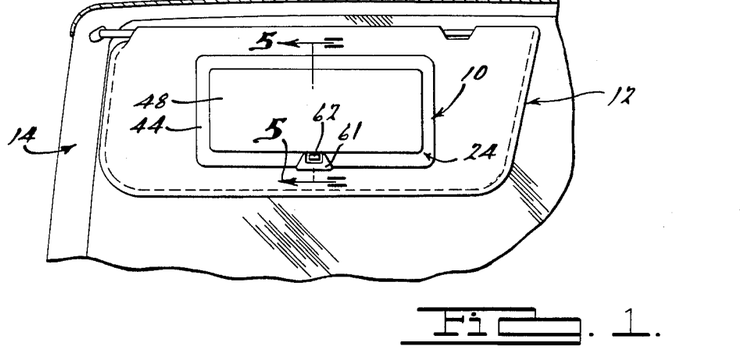
FIG. 1 is a partial elevational view of a vehicle visor shown in its lowered position and incorporating an exemplary vanity mirror assembly according to the present invention.
Figure 2:
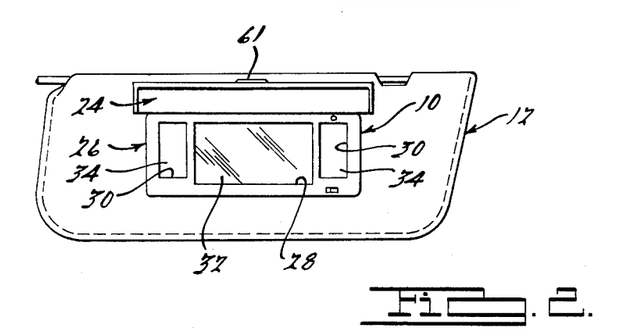
FIG. 2 is a partial elevational view similar to that of FIG. 1, but illustrating the vanity mirror assembly with its vanity door in an open position.
Figure 3:
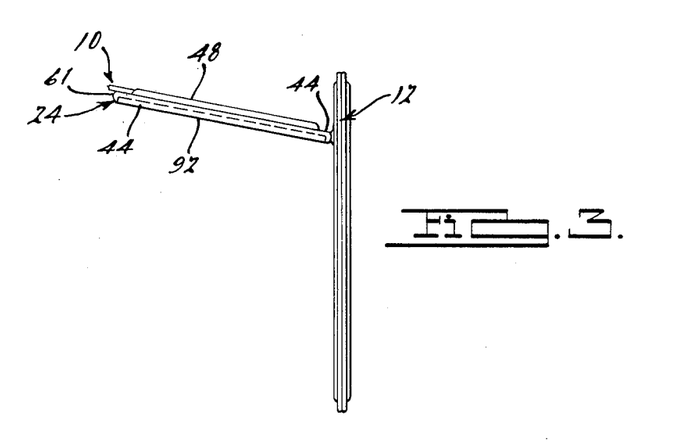
FIG. 3 is a side view of the vanity mirror assembly of FIGS. 1 and 2, illustrated with its vanity door in an open position.
Figure 4:
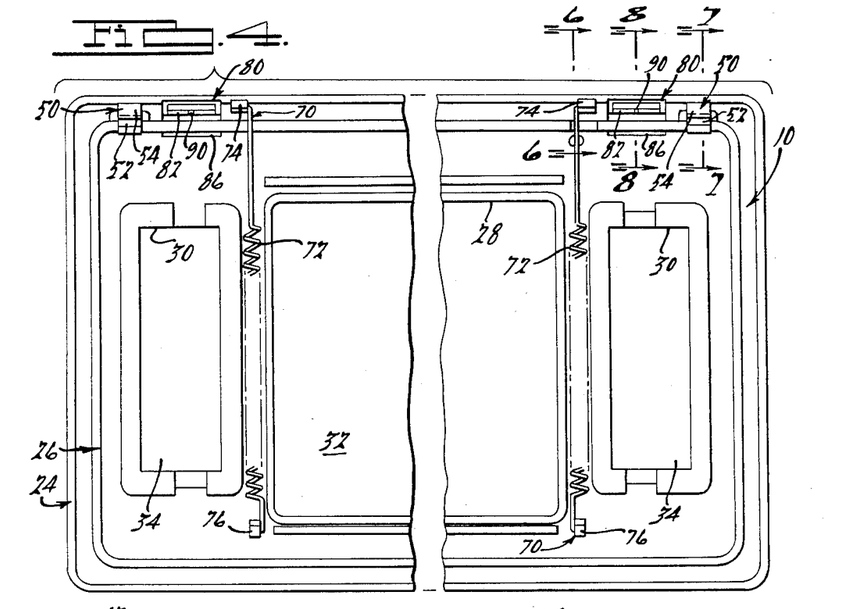
FIG. 4 is a rear elevational view of the vanity mirror assembly of FIGS. 1 through 3, illustrating various components and subassemblies thereof.
Figures 6, 7:
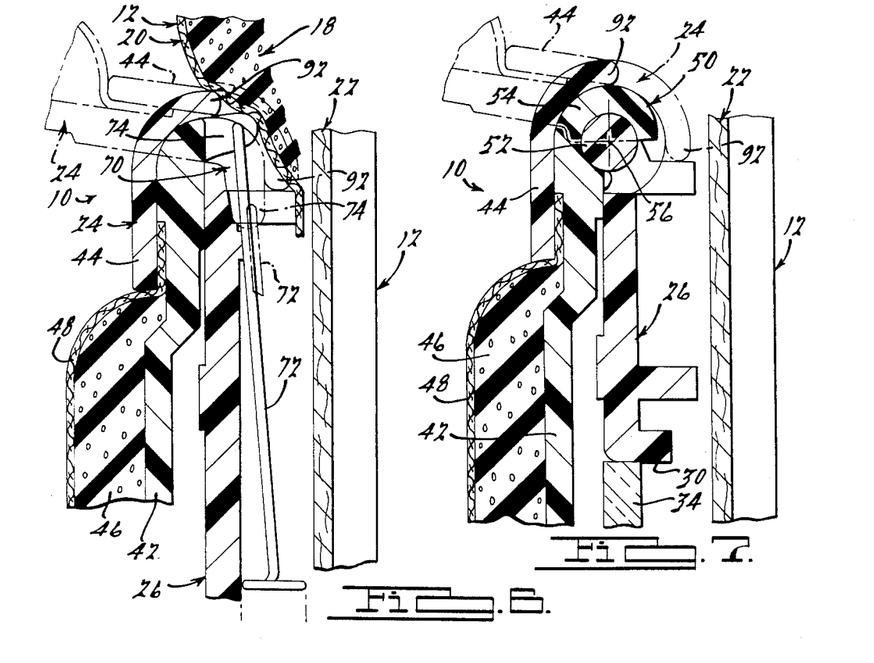
FIG. 6 is a partial cross-sectional view taken generally along line 6—6 of FIG. 4.
FIG. 7 is a partial cross-sectional view taken generally along line 7—7 of FIG. 4.
Figure 8:
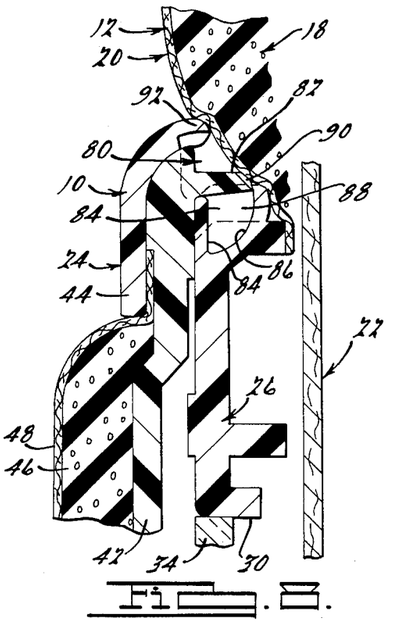
FIG. 8 is a partial cross-sectional view taken generally along line 8—8 of FIG. 4.
Figure 9:
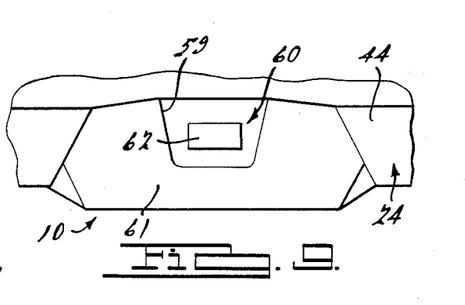
FIG. 9 is an enlarged partial elevational view of a portion of the vanity door of FIGS. 1 through 8, illustrating the preferred provision of an obstruction thereon to substantially prevent inadvertent actuation of the vanity door latch apparatus.
Figure 10:
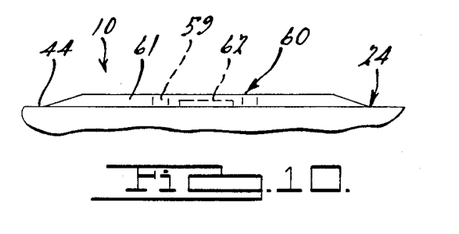
FIG. 10 is a partial edge view of the latch apparatus area of the vanity door shown in FIG. 9.

As shown in FIGS. 4 and 6, the preferred spring assembly 70 generally includes a spring member 72 interconnected with a spring lever 74 integrally formed with, or fixedly secured to, the vanity door 24, and a spring anchor 76 integrally formed with, or fixedly secured to, the vanity frame assembly 26. The spring 72 thus functions to resiliently bias the vanity door toward its open position shown in FIGS. 2 and 3, and to pivotally urge the vanity door 24 to its open position upon selective actuation of the release button 62 of the latch assembly 60. In this regard, although two spring assemblies 70 are shown in the drawings (see FIG. 4), a greater or lesser number of such spring assemblies can be employed in the present invention, depending upon the size and weight of the vanity door 24, the size of the vanity frame assembly 26, or other design parameters in a given application. Further in this regard, because the spring 72 in the preferred spring assembly 70 remains on the same, inboard side of the pivotal axis 56 (see FIG. 7) during pivotal movement of the vanity door 24, much less lateral inward and outward clearance is required between the vanity frame assembly 26 and the visor centerboard assembly 22 than is required in some overcenter spring assemblies employed in vanity assemblies known in the prior art.

In one preferred embodiment of the invention, a damper assembly 80 (shown in FIGS. 4 and 8) is provided for dampening the upward pivotal movement of the vanity door 24 under the influence of the spring member 72. The damper assembly 80 preferably includes a damper blade member 82 integrally formed with, or fixedly secured to, the vanity door 24 for pivotal movement therewith. A number of generally flat walls 84 are formed with, or fixedly secured to, the vanity frame assembly 26, and form a cavity 88 along with the preferably arcuate wall 86. The damper blade member 82 is received within the open end of the cavity 88 for relative motion into and out of the cavity 88 in a frictional and slidable engagement with the arcuate wall 86, and a damper opening 90 is preferably formed through the damper blade member 82 providing communication between the interior and exterior of the cavity 88 for the passage of air therebetween. During movement of the vanity door 24, the slidable and frictional engagement of the damper blade member 82 with the arcuate wall 86 serves to dampen the movement of the vanity door 24, therefore substantially preventing the vanity door from flopping or bouncing at the end of its travel during opening movement. In addition, the damper assembly 80 provides for a smooth, controlled movement of the vanity door from its closed position to its open position.

The dampening effect of the damper assembly 80 is also enhanced by the trapping and releasing of air within the cavity 88, whose volume changes substantially as the damper blade member 82 moves into and out of the cavity 88. In this regard, the degree of dampening effect of the damper assembly 80 can be preselected in order to suit a given application by the provision of an appropriately sized damper opening 90 extending through the damper blade member 82. Thus, by preselectively sizing the damper opening 90, the flow rate of air into and out of the cavity 88 during pivotal movement of the vanity door 24 can be preselected to obtain the desired magnitude of the dampening force provided by the damper assembly 80.

It should further be noted that although the damper blade member 82 is shown on the vanity door 24, and the walls 84 and 86 defining the cavity 88 are shown on the vanity frame assembly 26 for purposes of illustration in the drawings, one skilled in the art will readily recognize that these positions can optionally be reversed if desired in a given application, thus locating the walls 84 and 86 and the cavity 88 on the vanity door 24 and correspondingly locating the damper blade member 82 on the vanity frame assembly 26 for relative sliding and frictional movement therebetween.

In addition to the damper assembly 80 discussed above, it should be noted that the door bezel 44, or other portion of the vanity door 24, can also be equipped with a protrusion 92 located on the door bezel 44, or located on other portions of the vanity door 24, that frictionally engages and resiliently compresses the upholstery 20 and the padding 18 of the visor 12 during pivotal motion of the vanity door 24. Such frictional and sliding engagement of the protrusion 92 with the visor 12 also tends to dampen the pivotal movement of the vanity door 24. In addition, the provision of the protrusion 92, which preferably extends about the entire periphery of the vanity door assembly 24, results in a neat, substantially gap-free appearance of the vanity mirror assembly 10 when the vanity door assembly 24 is in its closed position, thus contributing greatly to the customerperceived quality of the vanity mirror assembly. It should be noted that in certain applications where the spring constant of the one or more spring members 72 is relatively low, due to a relatively small opening force being needed to open the vanity door 24, the damper assembly 80 can optionally be completely eliminated if the dampening effect of the engagement between the protrusion 92 and the visor 12 is deemed sufficient to achieve the desired dampening effect.

Figure 11:
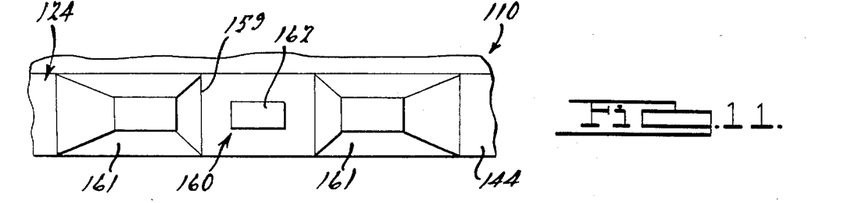
FIG. 11 is an enlarged partial elevational view similar to that of FIG. 9, but illustrating an alternate embodiment of the preferred provision of an obstruction for preventing inadvertent actuation of the vanity door latch apparatus.
Figure 12:
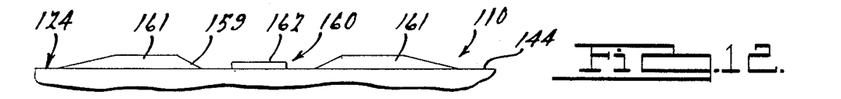
FIG. 12 is a partial edge view similar to that of FIG. 10, but illustrating the embodiment of FIG. 11.

FIGS. 11 and 12 illustrate an optional embodiment of the present invention, wherein the vanity mirror assembly 110 includes many components that are either identical with, or substantially similar to, corresponding components of the embodiment of FIGS. 1 through 10, either configuration or function. Accordingly, such corrresponding components of the embodiment of FIGS. 11 and 12 are indicated by reference numerals that are similar to those of the corresponding components of the embodiment of FIGS. 1 through 10, but with the corresponding reference numerals in FIGS. 11 and 12 having one-hundred prefixes.

In FIGS. 11 and 12, the vanity door 124 is equipped with an obstruction 161 that is made up of two separate and spaced-apart raised portions, with an opening 159 therebetween. The release button 162 of the latch assembly 160 is thereby disposed within the opening 159 in order to substantially minimize or prevent its inadvertent actuation in a manner generally similar to that described above in connection with the embodiment shown in FIGS. 1 through 10. In other respects, the embodiment of the present invention illustrated in FIGS. 11 and 12 is substantially similar to that of the embodiment shown in FIGS. 1 through 10.

Figures 13, 14, 15:
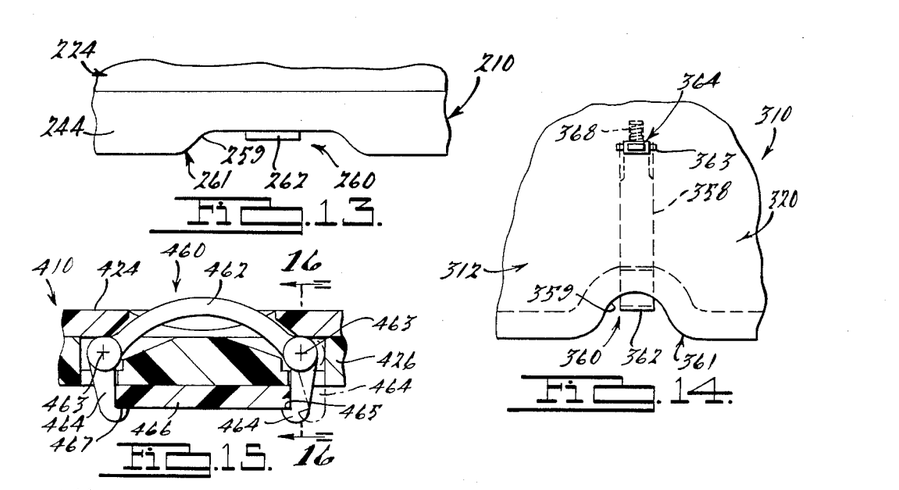
FIG. 13 is an enlarged partial elevational view similar to that of FIGS. 9 and 11, but illustrating still another alternate embodiment of the present invention, wherein the latch apparatus release button is recessed into the edge of the vanity door.
FIG. 14 is a view similar to that of FIG. 13, but illustrating still another optional arrangement wherein the latch apparatus release button is recessed into the edge of a vehicle visor.
FIG. 15 is a partial edge view of still another optional arrangement for the vanity door, illustrating a further alternate embodiment of a release button for the latch apparatus.

FIG. 13 illustrates still another optional embodiment of the present invention having many components that are identical with, or substantially similar to, corresponding components of the embodiment of FIGS. 1 through 10. Thus such corresponding components in FIG. 13 are indicated by corresponding reference numerals having two-hundred prefixes.

In FIG. 13, the release button 262 of the latch assembly 260 is slidably movable along a portion of the vanity door assembly 224 to actuate a pivotal latch member (not shown) in a manner similar to that described above in connection with the embodiment of FIGS. 1 through 10. In order to substantially minimize the inadvertent actuation of the release button 262, however, the vanity door 224 is provided with an obstruction 261 resulting from a recessed opening 259 located in the edge of the door bezel 244 of the vanity door 224, or located in a corresponding edge portion of the vanity door 224. Like the embodiments described above, the provision of the release button 262 in a recessed portion of the vanity door 224 substantially minimizes the inadvertent contact with, and resultant actuation of, the release button 262.

FIG. 14 illustrates still another alternate arrangement for the present invention, wherein the vanity mirror assembly 310 is similar in many respects with the embodiments described above, and therefore its corresponding components are indicated by corresponding reference numerals having three-hundred prefixes. The release button 362 in FIG. 14 operates in a manner substantially similar to that described above in connection with the embodiment of FIG. 13, except that the release button 362 of the latch assembly 360 is protected by an obstruction 361 resulting from the disposition of the release button 362 within a recessed portion 359 of the edge of the visor 312. Because the release button 362 protrudes outwardly within the recessed portion 359 on the edge of the visor 312, a linkage apparatus 358 is provided beneath the upholstered portion 320 of the visor 312 to actuate a pivotal latch member 364 disposed for pivotal movement about a pivot axis 363. The latch member 364 thus engages a catch member located on the vanity door assembly (not shown).

Figure 16:
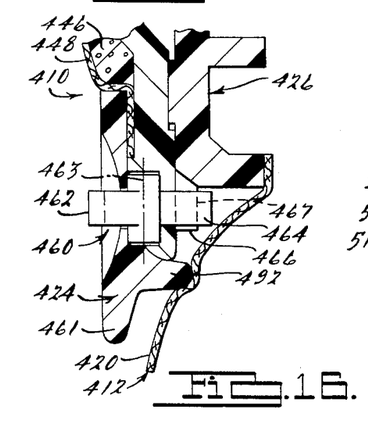
FIG. 16 is a partial-cross-sectional view taken generally along line 16—16 of FIG. 15.

FIGS. 15 and 16 illustrate a further optional arrangement for a latch assembly 460 on a vanity mirror assembly 410. Because many of the components of the vanity assembly 410 are substantially identical with, or similar to, corresponding components of the embodiments discussed above, such corresponding components are indicated by similar reference numerals having four-hundred prefixes.

The latch assembly 460 shown in FIGS. 15 and 16 includes a release button 462 having a generally arcuate configuration and a pair of latch members 464 interconnected therewith for pivotal motion about pivot axes 463 when the resiliently deflectable and arcuately-shaped release button 462 is depressed and deformed inwardly relative to the outer surface of the vanity door 424. Such depression of the release button 462, along with the corresponding outward pivotal motion of the latch members 464 causes the latching surfaces 465 and 467 of the latch member 464 and the catch member 466, respectively, to become disengaged, thereby releasing the vanity door assembly 424 for opening pivotal movement.

Although not shown in FIGS. 15 and 16, the latching surfaces 465 and 467 of the latch member 464 and the catch member 466, respectively, can optionally be disposed at an angular relationship with a generally vertical plane, in a manner similar to that described above in connection with the embodiment of FIGS. 1 through 10. This allows slidable relative movement of the latching surfaces 465 and 467 to override the latch assembly 460 and release the vanity door assembly 424, without actuation of the release button 462, in response to predetermined excessive opening forces being exerted on the vanity door 424. As mentioned above, such an arrangement substantially prevents damage to the latch assembly 460 in the event that the user attempts to open the vanity door 424 without first releasing the latch assembly 460.

Figure 17:
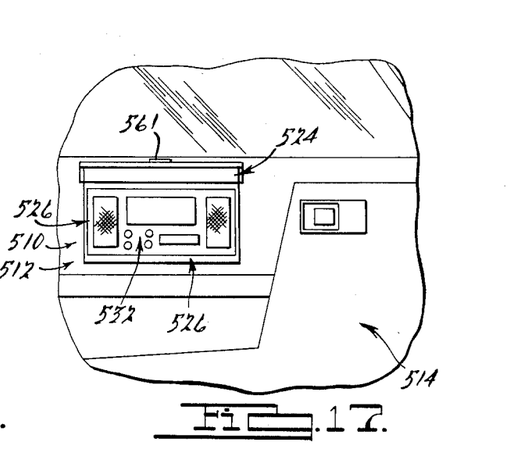
FIG. 17 is a partial elevational view similar to that of FIG. 2, but illustrating a vehicle accessory device other than the vanity mirror assembly shown in FIGS. 1 and 2, and illustrating the mounting of the vehicle accessory assembly on an interior vehicle panel other than a visor.

Finally, in FIG. 17, a vehicle accessory assembly 510 is illustrated for mounting on a vehicle interior panel 512 of a vehicle interior 514 other than on a visor assembly. In the vehicle accessory assembly 510, the mirror 32 and the side lights 34 (described above in connection with FIGS. 1 through 10) are replaced by an audio accessory arrangement 532, shown for purposes of illustration. One skilled in the art will readily recognize that other vehicle accessory devices can also be alternately included in the vehicle accessory assembly 510, and that a mirror-and-light vanity assembly can also be mounted on a vehicle interior panel other than a visor. In other respects, the various components of the vehicle accessory assembly 510 are generally similar in configuration or in function to the corresponding components of the embodiments described above. Therefore, such corresponding components are indicated by similar reference numerals having five-hundred prefixes.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

We claim:

1. A vehicle accessory assembly adapted for mounting on an interior vehicle panel, said accessory assembly comprising: an accessory device interconnectable with the interior vehicle panel at a generally fixed location thereon; a top-hinged accessory door pivotally interconnectable with the interior vehicle panel for selective pivotal movement about a pivot axis between a closed position wherein said accessory device is substantially covered and an open position wherein said accessory device is substantially exposed; resilient biasing means for resiliently biasing said accessory door toward said open position; latch means for releasably retaining said accessory door in said closed position, said latch means being selectively actuable to release said accessory door, said resilient biasing means urging said accessory door into said open position when said latch means is slectively actuated to release said accessory door; and damper means for dampening said pivotal movement of said accessory door.

2. A vehicle accessory assembly according to claim 1, further comprising latch override means for releasing said accessory door without said actuation of said latch means in response to an opening force exerted upon said accessory door in excess of a predetermined threshold opening force in order to override said latch means and substantially prevent damage thereto.

3. A vehicle accessory assembly according to claim 1, further comprising obstruction means associated with said latch means for substantially obstructing access to said latch means from a predetermined position generally adjacent said latch means in order to substantially prevent actuation of said latch means from said predetermined position.

4. A vehicle accessory assembly according to claim 1, wherein said latch means includes a catch member, a manually operable actuating member, and a latch member, said catch member being interconnectable with said interior vehicle panel, and said actuating member and said latch member being interconnected with said accessory door for movement in association with one another relative to said accessory door between a first position wherein said latch member generally interferingly engages said catch member to retain said accessory door in said closed position and a second position wherein said latch member disengages said catch member to release said accessory door.

5. A vehicle accessory assembly according to claim 4, further comprising obstruction means associated with said actuating member for substantially obstructing access to said actuating member from a predetermined position generally adjacent said actuating member in order to substantially prevent operation of said actuating member from said predetermined position.

6. A vehicle accessory assembly according to claim 5, wherein said obstruction means comprises at least one raised portion of said accessory door generally adjacent said actuating member.

7. A vehicle accessory assembly according to claim 5, wherein said obstruction means comprises a recessed portion of said accessory door, said actuating member being disposed at least partially within said recessed portion of said accessory door.

8. A vehicle accessory assembly according to claim 4, wherein said latch member and said catch member each have latching engagement surfaces thereon, said latching engagement surfaces being mutually and generally interferingly engageable with one another when said actuating member and said latch member are in said first position; said latching surfaces being slidably movable relative to one another out of said engagement with one another when said actuating member and said latch member are in said first position in response to an opening force exerted upon said accessory door in excess of a predetermined threshold opening force in order to override said latch means and release said accessory door and substantially prevent damage to said latch means in response to said predetermined threshold opening force.

9. A vehicle accessory assembly according to claim 4, wherein said latch means further includes latch resilient biasing means for resiliently biasing said actuating member and said latch member into said first position.

10. A vehicle accessory assembly according to claim 1, wherein said latch means includes a catch member, a manually operable actuating member, and a latch member, said catch member being interconnected with said accessory door, and said actuating member and said latch member being interconnectable with said interior vehicle panel for movement in association with one another relative to said interior vehicle panel between a first position wherein said latch member generally interferingly engages said catch member to retain said accessory door in said closed position and a second position wherein said latch member disengages said catch member to release said accessory door.

11. A vehicle accesory assembly according to claim 10, further comprising obstruction means associated with said actuating member for substantially obstructing access to said actuating member from a predetermined position generally adjacent said actuating member in order to substantially prevent operation of said actuating member from said predetermined position.

12. A vehicle accessory assembly according to claim 11, wherein said obstruction means comprises a recessed portion of said interior vehicle panel, said actuating member being disposed at least partially within said recessed portion of said interior vehicle panel.

13. A vehicle accessory assembly according to claim 10, wherein said latch member and said catch member each have latching engagement surfaces thereon, said latching engagement surfaces being mutually and generally interferingly engageable with one another when said actuating member and said latch member are in said first position; said latching surfaces being slidably movable relative to one another out of said engagement with one another when said actuating member and said latch member are in said first position in response to an opening force exerted upon said accessory door in excess of a predetermined threshold opening force in order to override said latch means and release said accessory door and substantially prevent damage to said latch means in response to said predetermined threshold opening force.

14. A vehicle accessory assembly according to claim 10, wherein said latch means further includes latch resilient biasing means for resiliently biasing said actuating member and said latch member into said first position.

15. A vehicle accessory assembly according to claim 1, wherein said damper means includes a first damper member interconnected with one of said accessory door and said interior vehicle panel, and a second damper member interconnected with the other of said accessory door and said interior vehicle panel, said first damper member including a number of walls defining a cavity having an open end and a closed end, said cavity receiving at least a portion of said second damper member therewithin, said second damper member and at least one of said walls being in a frictional engagement with one another for relative slidable movement as said accessory door is pivotally moved about said pivotal axis, said sliding frictional relative movement of said damper members dampening said pivotal movement of said accessory door.

16. A vehicle accessory assembly according to claim 15, wherein said second damper member substantially closes off said cavity, said second damper member having a damper opening therethrough providing communication between the exterior and the interior of said cavity, said damper opening being of a predetermined size in order to permit a corresponding predetermined air flow rate into and out of said cavity said sliding frictional relative movement of said damper members.

17. A vehicle accessory assembly according to claim 1, wherein said damper means includes a protrusion on said accessory door slidably movable along a portion of said interior vehicle panel in a frictional engagement therewith as said accessory door is pivotally moved about said pivotal axis, said sliding frictional movement of said protrusion along said interior vehicle panel dampening said pivotal movement of said accessory door.

18. A vehicle vanity assembly adapted for mounting on a vehicle visor, said vanity assembly comprising: a vanity device interconnectable with the visor at a generally fixed location thereon; a top-hinged vanity door pivotally interconnected with the visor for selective pivotal movement about a pivot axis between a closed position wherein said vanity device is substantially covered and an open position wherein said vanity device is substantially exposed; resilient biasing means for resiliently biasing said vanity door toward said open position; latch means for releasably retaining said vanity door in said closed position, said latch means being selectively actuable to release said vanity door, said resilient biasing means urging said vanity door into said open position when said latch means is selectively actuated to release said vanity door; and damper means for dampening said pivotal movement of said vanity door.

19. A vanity assembly according to claim 18, further comprising latch override means for releasing said vanity door without said actuation of said latch means in response to an opening force exerted upon said vanity door in excess of a predetermined threshold opening force in order to override said latch means and substantially prevent damage thereto.

20. A vanity assembly according to claim 18, further comprising obstruction means associated with said latch means for substantially obstructing access to said latch means from a predetermined position generally adjacent said latch means in order to substantially prevent actuation of said latch means from said predetermined position.

21. A vanity assembly according to claim 18, wherein said latch means includes a catch member, a manually operable actuating member, and a latch member, said catch member being interconnectable with said visor, and said actuating member and said latch member being interconnected with said vanity door for movement in association with one another relative to said vanity door between a first position wherein said latch member generally interferingly engages said catch member to retain said vanity door in said closed position and a second position wherein said latch member disengages said catch member to release said vanity door.

22. A vanity assembly according to claim 21, further comprising obstruction means associated with said actuating member for substantially obstructing access to said actuating member from a predetermined position generally adjacent said actuating member in order to substantially prevent operation of said actuating member from said predetermined position.

23. A vanity assembly according to claim 22, wherein said obstruction means comprises at least one raised portion of said vanity door generally adjacent said actuating member.

24. A vanity assembly according to claim 22, wherein said obstruction means comprises a recessed portion of said vanity door, said actuating member being disposed at least partially within said recessed portion of said vanity door.

25. A vanity assembly according to claim 21, wherein said latch member and said catch member each have latching engagement surfaces thereon, said latching engagement surfaces being mutually and generally interferingly engageable with one another when said actutating member and said latch member are in said first position; said latching surfaces being slidably movable relative to one another out of said engagement with one another when said actuating member and said latch member are in said first position in response to an opening force exerted upon said vanity door in excess of a predetermined threshold opening force in order to override said latch means and release said vanity door and substantially prevent damage to said latch means in response to said predetermined threshold opening force.

26. A vanity assembly according to claim 21, wherein said latch means further includes latch resilient biasing means for resiliently biasing said actuating member and said latch member into said first position.

27. A vanity assembly according to claim 18, wherein said latch means includes a catch member, a manually operable actuating member, and a latch member, said catch member being interconnected with said vanity door, and said actuating member and said latch member being interconnectable with said visor for movement in association with one another relative to said visor between a first position wherein said latch member generally interferingly engages said catch member to retain said vanity door in said closed position and a second position wherein said latch member disengages said catch member to release said vanity door.

28. A vanity assembly according to claim 27, further comprising obstruction means associated with said actuating member for substantially obstucting access to said actuating member from a predetermined position generally adjacent said actuating member in order to substantially prevent operation of said actuating member from said predetermined position.

29. A vanity assembly according to claim 28, wherein said obstruction means comprises a recessed portion of said visor, said actuating member being disposed at least partially within said recessed portion of said visor.

30. A vanity assembly according to claim 27, wherein said latch member and said catch member each have latching engagement surfaces thereon, said latching engagement surfaces being mutually and generally interferingly engageable with one another when said actutating member and said latch member are in said first position; said latching surfaces being slidably movable relative to one another out of said engagement with one another when said actuating member and said latch member are in said first position in response to an opening force exerted upon said vanity door in excess of a predetermined threshold opening force in order to override said latch means and release said vanity door and substantially prevent damage to said latch means in response to said predetermined threshold opening force.

31. A vanity assembly according to claim 27, wherein said latch means further includes latch resilient biasing means for resiliently biasing said actuating member and said latch member into said first position.

32. A vanity assembly according to claim 18, wherein said damper means includes a first damper member interconnected with one of said vanity door and said visor, and a second damper member interconnected with the other of said vanity door and said visor, said first damper member including a number of walls defining a cavity having an open end and a closed end, said cavity receiving at least a portion of said second damper member therewithin, said second damper member and at least one of said walls being in a frictional engagement with one another for relative slidable movement as said vanity door is pivotally moved about said pivotal axis, said sliding frictional relative movement of said damper members dampening said pivotal movement of said vanity door.

33. A vanity assembly according to claim 32, wherein said second damper member substantially closes off said cavity, said second damper member having a damper opening therethrough providing communication between the exterior and the interior of said cavity, said damper opening being of a predetermined size in order to permit a corresponding predetermined air flow rate into and out of said cavity during said sliding relative movement of said damper members.

34. A vanity assembly according to claim 18, wherein said damper means includes a protrusion on said vanity door slidably movable along a portion of said visor in a frictional engagement therewith as said vanity door is pivotally moved about said pivotal axis, said sliding frictional movement of said protrusion along said visor dampening said pivotal movement of said vanity door.

35. A vehicle vanity assembly adapted for mounting on a vehicle visor, said vanity assembly comprising: a vanity device interconnectable with the visor at a generally fixed location thereon; a top-hinged vanity door pivotally interconnectable with the visor for selective pivotal movement about a pivot axis between a closed position wherein said vanity device is substantially covered and an open position wherein said vanity device is substantially exposed; resilient biasing means for resiliently biasing said vanity door toward said open position; latch means for releasably retaining said vanity door in said closed position, said latch means being selectively actuable to release said vanity door, said resilient biasing means urging said vanity door into said open position when said latch means is selectively actuated to release said vanity door; latch override means for releasing said vanity door without said actuation of said latch means in response to an opening force exerted upon said vanity door in excess of a predetermined threshold opening force in order to override said latch means and substantially prevent damage thereto; obstruction means associated with said latch means for substantially obstructing access to said latch means from a predetermined position generally adjacent said latch means in order to substantially prevent actuation of said latch from said predetermined position; and damper means for dampening said pivotal movement of said vanity door.

36. A vanity assembly according to claim 35, wherein said latch means includes a catch member, a manually operable actuating member, and a latch member, said catch member being interconnectable with said visor, and said actuating member and said latch member being interconnected with said vanity door for movement in association with one another relative to said vanity door between a first position wherein said latch member generally interferingly engages said catch member to retain said vanity door in said closed position and a second position wherein said latch member disengages said catch member to release said vanity door, said latch member and said catch member each have latching engagement surfaces thereon, said latching engagement surfaces being mutually and generally interferingly engageable with one another when said actuating member and said latch member are in said first position; said latching surfaces being slidably movable relative to one another out of said engagement with one another when said acutating member and said latch member are in said first position in response to an opening force exerted upon said vanity door in excess of a predetermined threshold opening force in order to override said latch means and release said vanity door and substantially prevent damage to said latch means in response to said predetermined threshold opening force.

37. A vanity assembly according to claim 36, wherein said obstruction means comprises at least one raised portion of said vanity door generally adjacent said actuating member.

38. A vanity assembly according to claim 36, wherein said obstruction means comprises a recessed portion of said vanity door, said actuating member being disposed at least partially within said recessed portion of said vanity door.

39. A vanity assembly according to claim 36, wherein said latch means further includes latch resilient biasing means for resiliently biasing said actuating member and said latch member into said first position.

40. A vanity assembly according to claim 35, wherein said latch means includes a catch member, a manually operable actuating member, and a latch member, said catch member being interconnected with said vanity door, and said actuating member and said latch member being interconnected with said visor for movement in association with one another relative to said visor between a first position wherein said latch member generally interferingly engages said catch member to retain said vanity door in said closed position and a second position wherein said latch member disengages said catch member to release said vanity door, said latch member and said catch member each having latching engagement surfaces thereon, said latching engagement surfaces being mutually and generally interferingly engageable with one another when said actuating member and said latch member are in said first position; said latching surfaces being slidably movable relative to one another out of said engagement with one another when said actuating member and said latch member are in said first position in response to an opening force exerted upon said vanity door in excess of a predetermined threshold opening force in order to override said latch means and release said vanity door and substantially prevent damage to said latch means in response to said predetermined threshold opening force.

41. A vanity assembly according to claim 40, wherein said obstruction means comprises a recessed portion of said visor, said actuating member being disposed at least partially within said recessed portion of said visor.

42. A vanity assembly according to claim 40, wherein said latch means further includes latch resilient biasing means for resiliently biasing said actuating member and said latch member into said first position.

43. A vanity assembly according to claim 35, wherein said damper means includes a first damper member interconnected with one of said vanity door and said visor, and a second damper member interconnected with the other of said vanity door and said visor, said first damper member including a number of walls defining a cavity having an open end and a closed end, said cavity receiving at least a portion of said second damper member therewithin, said second damper member and at least one of said walls being in a frictional engagement with one another for relative slidable movement as said vanity door is pivotally moved about said pivotal axis, said sliding frictional relative movement of said damper members dampening said pivotal movement of said vanity door, said second damper member substantially closing off said cavity, said second damper member having a damper opening therethrough providing communication between the exterior and the interior of said cavity, said damper opening being of a predetermined size in order to permit a corresponding predetermined air flow rate into and out of said cavity during said sliding frictional relative movement of said damper members.

44. A vanity assembly according to claim 35, wherein said damper means includes a protrusion on said vanity door slidably movable along a portion of said visor in a frictional engagement therewith as said vanity door is pivotally moved about said pivotal axis, said sliding frictional movement of said protrusion along said visor dampening said pivotal movement of said vanity door.

* * * * *